United States Patent
Mori et al.

(10) Patent No.: US 7,509,042 B2
(45) Date of Patent: Mar. 24, 2009

(54) DIGITAL CAMERA, IMAGE CAPTURE METHOD, AND IMAGE CAPTURE CONTROL PROGRAM

(75) Inventors: Keiichi Mori, Tokyo (JP); Sumito Yoshikawa, Kanagawa (JP); Kenichi Nakajima, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 474 days.

(21) Appl. No.: 11/313,464

(22) Filed: Dec. 21, 2005

(65) Prior Publication Data
US 2007/0025718 A1 Feb. 1, 2007

(30) Foreign Application Priority Data
Jul. 29, 2005 (JP) ............................ 2005-220752

(51) Int. Cl.
G03B 15/03 (2006.01)
(52) U.S. Cl. ........................ 396/155; 396/322; 348/239; 348/371
(58) Field of Classification Search ................. 396/155, 396/322; 348/218.1, 239, 370, 371
See application file for complete search history.

(56) References Cited

U.S. PATENT DOCUMENTS 7,002,624 B1 * 2/2006 Uchino et al. ............ 348/225.1
7,039,307 B2 * 5/2006 Uchida ........................ 396/67
7,102,683 B2 * 9/2006 Perry et al. ................. 348/370
7,389,041 B2 * 6/2008 Gindele et al. ............... 396/98

FOREIGN PATENT DOCUMENTS

JP 2000066087 3/2000
JP 2000307941 11/2000

* cited by examiner

Primary Examiner—W. B. Perkey
(74) Attorney, Agent, or Firm—Pamela R. Crocker

(57) ABSTRACT

The present invention provides a digital camera that is capable of capturing a picture in which the brightness between a main subject and a nighttime background are well balanced. When an image capture instruction is received while a night scene portrait mode is set, in a pixel addition output mode, an image sensor 16 is set to a high sensitivity state by performing pixel addition, and outputs low resolution non-flash image data. Further, in an overall pixel output mode, the image sensor 16 outputs high resolution flash image data in a low sensitivity state without performing pixel addition. Next, a resolution conversion circuit 40 converts a resolution of non-flash image data to be equivalent to a resolution of flash image data. Then, an image combining circuit 60 adds respective pixel values of corresponding pixels in the non-flash image data and the flash image data having the same resolution and combines both sets of image data to generate image data for recording.

14 Claims, 6 Drawing Sheets

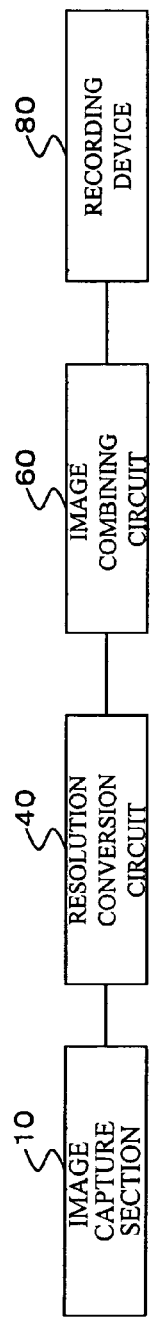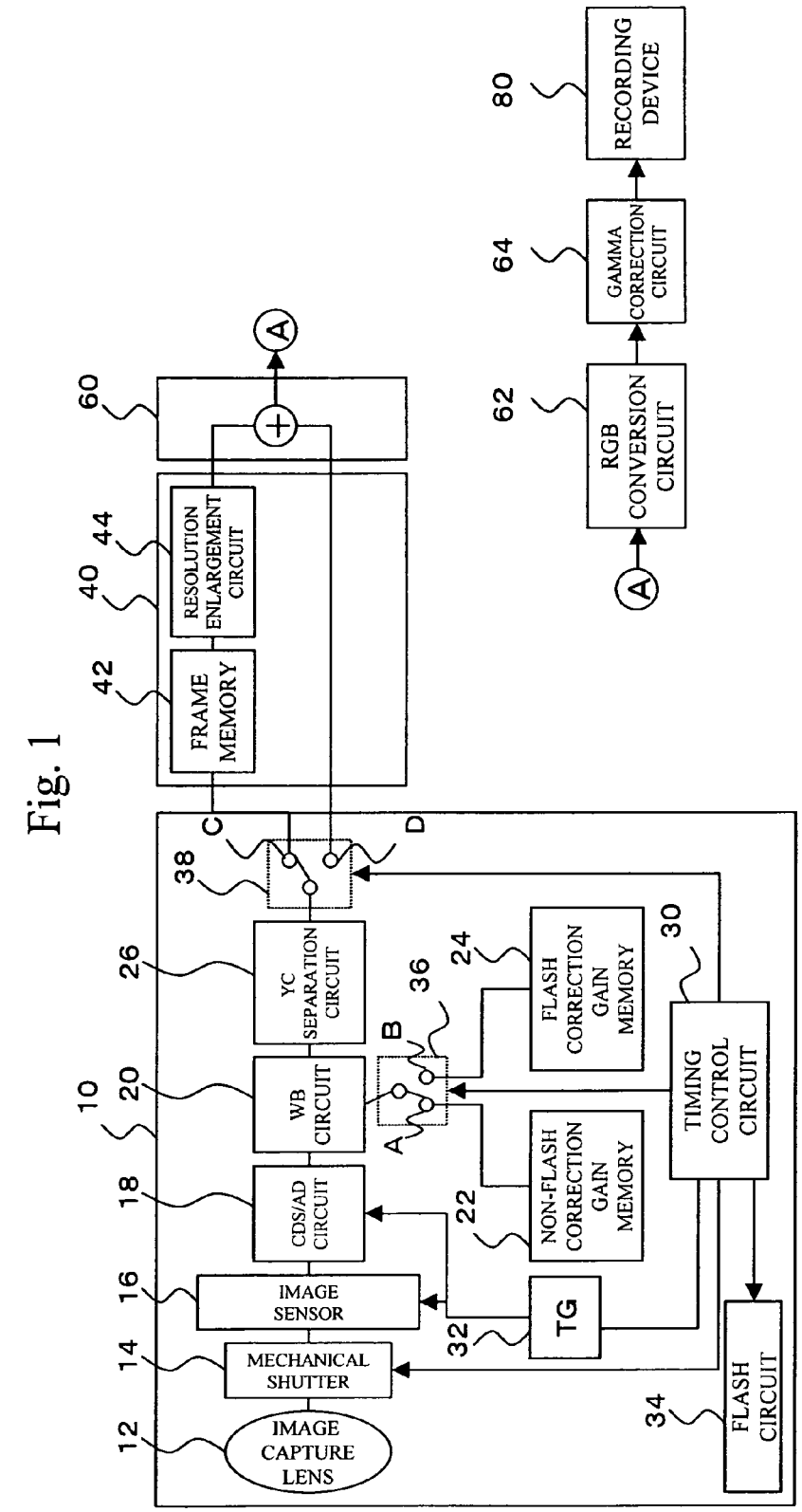

DIGITAL CAMERA, IMAGE CAPTURE METHOD, AND IMAGE CAPTURE CONTROL PROGRAM

FIELD OF THE INVENTION

The present invention relates to a digital camera that is capable of selecting an image capture mode to photograph a main subject in a nighttime background with emission of flash light.

BACKGROUND OF THE INVENTION

Heretofore, it has been very difficult to obtain a picture in which brightness between a person and a nighttime background is well-balanced in a case where the person or the like that is a main subject is photographed with a nighttime background with emission of flash light.

As described in Japanese Patent Application Laid-Open No. 2000-66087, and Japanese Patent Application Laid-Open No. 2000-307941, there exists a technique in which image capture with emission of flash light and image capture without emission of flash light are continuously performed in a case where a person is photographed in a nighttime background by use of a digital camera, and two images are combined after the image capture to generate a captured image in the nighttime background.

However, in the above-described conventional technique, when an exposure period is lengthened in order to obtain a satisfactory captured image with respect to a nighttime background portion, camera shake and the like are easily caused, and it is difficult to obtain the satisfactory captured image. When the exposure period is shortened in order to reduce the effects of the hand shake and the like, and an amplification factor of image data output from a solid-state image sensor is raised, the image is easily affected by noise such as thermal noise. Even in this case, it is difficult to obtain the satisfactory captured image.

SUMMARY OF THE INVENTION

An object of the present invention is to provide a digital camera that is capable of capturing a picture in which brightness between a main subject and a nighttime background is well-balanced.

According to the present invention, there is provided a digital camera comprising: an image sensor that converts subject image information into an image signal and outputs the image signal; and a flash circuit for emitting flash light, wherein the image sensor has a first image capture mode in which a first image signal having a relatively large number of pixels captured at a relatively low sensitivity is output, and a second image capture mode in which a second image signal having a relatively small number of pixels captured at a relatively high sensitivity is output, the digital camera further comprising: an image capture control circuit that performs an operation for capturing and outputting the second image signal in the second image capture mode without emission of flash light by the flash circuit and an operation for capturing and outputting the first image signal in the first image capture mode with emission of flash light by the flash circuit; and an image combining circuit that combines the first image signal and the second image signal after resizing the number of pixels of at least one image signal of the first image signal and the second image signal.

In one mode of the digital camera according to the present invention, in the second image capture mode, electric charges of a plurality of pixels of the image sensor are added up to thereby capture and output an image at a high sensitivity.

According to the present invention, when an instruction for night scene portrait image capture is received, the image capture control circuit performs the operation for capturing and outputting the second image signal in the second image capture mode without emission of flash light by the flash circuit and the operation for capturing and outputting the first image signal in the first image capture mode with emission of flash light by the flash circuit. Moreover, the image combining circuit resizes the number of the pixels of at least one of the first and second image signals to combine both of the image signals. Accordingly, it is possible to capture the picture in which the brightness between the main subject and the nighttime background is well-balanced.

BRIEF DESCRIPTION OF THE DRAWINGS

FIG. 1 is a diagram schematically showing functional blocks of a digital camera in the present embodiment;

FIG. 2 is a diagram specifically showing functional blocks of the digital camera in the present embodiment;

DETAILED DESCRIPTION OF THE INVENTION

Figure 3:
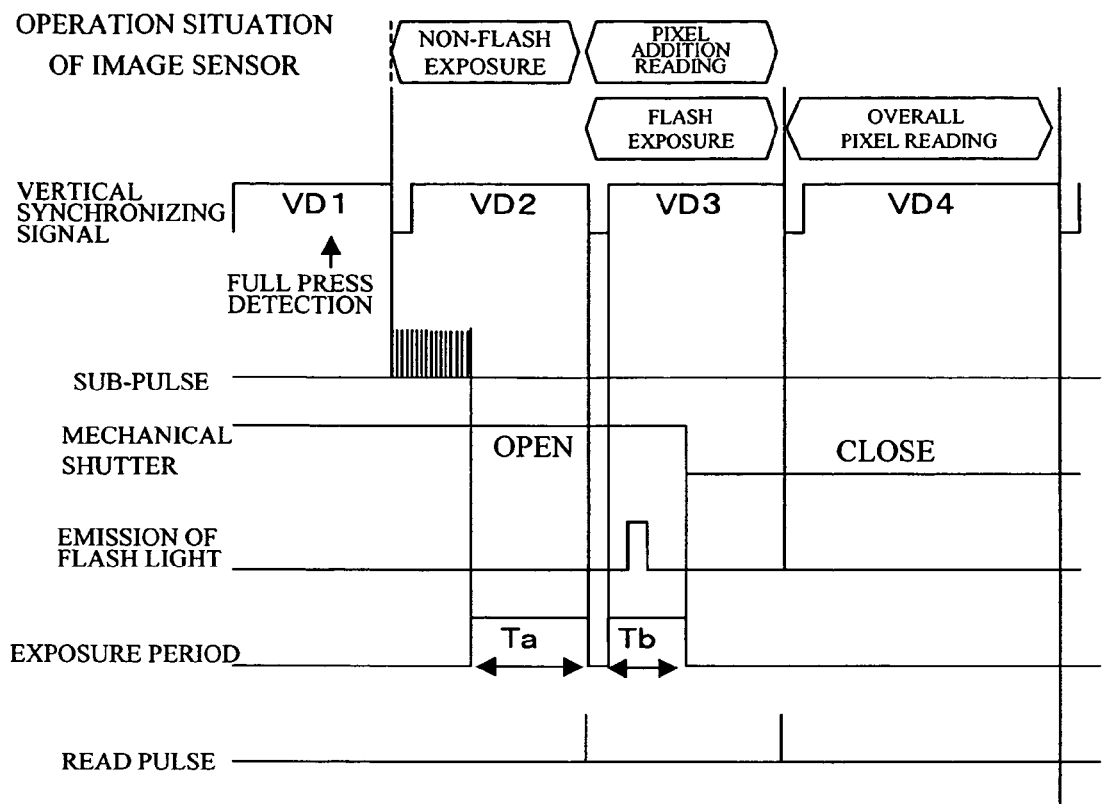
FIG. 3 is a timing chart in a case where the digital camera of the present embodiment performs image capture in a night scene portrait mode.

According to the present embodiment, a digital camera is capable of selecting a night scene portrait mode suitable for photographing a main subject such as a person in a nighttime background. The digital camera set to the night scene portrait mode successively performs an image capture (hereinafter referred to as the "non-flash image capture") without emission of flash light and an image capture with emission of flash light in response to one image capture instruction. The digital camera combines image data (hereinafter referred to as the "non-flash image data") obtained by the non-flash image capture with image data (hereinafter referred to as the "flash image data") obtained by flash image capture to thereby generate image data for recording.

FIG. 1 is a diagram showing functional blocks of the digital camera according to the present embodiment. An image capture section 10 comprises a solid-state image sensor that is capable of outputting image data (hereinafter referred to as the "low resolution image data") having a low resolution at a high sensitivity, and outputting image data (hereinafter referred to as the "high resolution image data") having a high resolution at a low sensitivity. The image capture section 10 outputs the low resolution image data in a case where the non-flash image data is output, and outputs the high resolution image data in a case where the flash image data is output. A resolution conversion circuit 40 resizes the number of the pixels of at least one image data to be equivalent to that of the image data output from the image capture section 10. An image combining circuit 60 combines two sets of image data whose image size agree with each other to thereby generate the image data for recording, and records the data in a recording device 80.

FIG. 2 is a diagram showing more detailed functional blocks of the digital camera according to the present embodiment. An image capture lens 12 is a lens group constituted of various types of lenses such as a focus lens and a zoom lens. A mechanical shutter 14 physically interrupts light which enters an image sensor 16 from a subject field. The light from the subject field is transmitted to the image sensor 16 via the image capture lens 12 and the mechanical shutter 14.

The image sensor 16 photoelectrically converts the incident light into a signal charge by a light receiving element array to output the signal charge. The light receiving element array of the image sensor 16 is constituted of longitudinal M×lateral N (M, N are integers) pixels to which filters of colors of red (R), green (G), and blue (B) have been added. The signal charge output from the image sensor 16 constitutes the image data having color components R, G, and B. The image sensor 16 is a solid-state image sensor that is capable of appropriately switching between modes. These modes are: a mode (hereinafter referred to as the "pixel addition output mode") in which the signal charges of nine pixels having the same color components are added up and output to multiply a sensitivity ninefold, and the low resolution image data having a relatively low resolution is output at a high sensitivity; and a mode (hereinafter referred to as the "overall pixel output mode") in which the signal charge of one pixel is independently output to thereby output the high resolution image data having a relatively high resolution at a low sensitivity. It is to be noted that when the number of signal charges to be added up is increased, the sensitivity can be further enhanced.

Additionally, in a case where the image capture is performed without the emission of the flash light in a night scene, an exposure period usually needs to be lengthened comparatively in order to secure adequate exposure. However, when the exposure period is lengthened, it is difficult to obtain satisfactory image data owing to camera shake, movement of a person or the like as the subject, etc. On the other hand, when an amplification factor of the image data output from the image sensor is raised in order to secure the adequate exposure while shortening the exposure period, noise increases. In this case, it is also difficult to obtain the satisfactory image data. To solve the problem, in the present embodiment, in a case where the non-flash image capture is performed in the night scene portrait mode, the image sensor 16 operates in the pixel addition output mode, and adds up the pixels to output the resultant image data. Accordingly, the high sensitivity is realized while shortening the exposure period. Consequently, degradation of an image quality due to camera shake or movement of the person can be prevented at the time of a non-flash image capture.

A correlated double sampling (CDS)-analog/digital (AD) circuit 18 extracts the image signal component of each pixel constituting the image data output from the image sensor 16 by correlated double sampling, and converts the data into a digital signal.

A white balance (WB) circuit 20 multiplies pixel values of the respective color components R, G, and B included in the image data by desired gains, respectively. Accordingly, the WB circuit 20 subjects the image data to white balance adjustment. A non-flash correction gain memory 22 stores a correction gain (hereinafter referred to as the "non-flash correction gain") for use in a case where the WB circuit 20 performs the white balance adjustment with respect to the non-flash image data. On one hand, a flash correction gain memory 24 stores a correction gain (hereinafter referred to as the "flash correction gain") for use in a case where the WB circuit 20 performs the white balance adjustment with respect to the flash image data. A first selector 36 operates a switch based on a switch signal from a timing control circuit 30. The WB circuit 20 performs the white balance adjustment by use of the non-flash correction gain in a case where the switch is connected to a contact A. On the other hand, the WB circuit 20 performs the white balance adjustment by use of the flash correction gain in a case where the switch is connected to a contact B.

A YC separation circuit 26 converts the non-flash image data and the flash image data output from the WB circuit 20 into a color space of YCrCb. The non-flash image data output from the YC separation circuit 26 is input into the resolution conversion circuit 40 via a contact C of a second selector 38. On the other hand, the flash image data output from the YC separation circuit 26 is input into the resolution conversion circuit 40 via a contact D of the second selector 38.

The timing control circuit 30 outputs a control signal to each circuit or the like constituting the digital camera. To be more specific, the timing control circuit 30 outputs a reference pulse to a timing generator (TG) 32. The timing control circuit 30 outputs to the TG 32 a mode switch signal indicating an instruction for switching an output mode of the image sensor 16. The timing control circuit 30 outputs a switch changeover signal to the first selector 36 or the second selector 38. Furthermore, the timing control circuit 30 outputs a mechanical shutter signal for instructing opening/closing of the mechanical shutter 14, or a flash emission signal for instructing a flash circuit 34 to emit the flash light.

The TG 32 outputs a horizontal synchronizing signal (HD) and a vertical synchronizing signal (VD) required for driving the light receiving element array included in the image sensor 16, and a synchronizing signal required for the CDS-AD circuit 18 to process signals based on the reference pulse output from the timing control circuit 30 to synchronize the image sensor 16 with the CDS-AD circuit 18.

The flash circuit 34 emits the flash light for irradiating a subject in order to achieve adequate exposure during the image capture. Furthermore, the flash circuit 34 emits slight flash light (hereinafter referred to as "pre-emission") for exposure measurement prior to the emission.

A frame memory 42 is a buffer that temporarily holds the non-flash image data until the flash image data is output. A resolution enlargement circuit 44 converts the resolution of the non-flash image data to be equivalent to that of the flash image data to thereby match an image size of the non-flash image data with that of the flash image data. That is, in the present embodiment, the flash image data is the image data obtained without adding up the pixels. Therefore, there is a ninefold difference between the resolutions of the non-flash image data and the flash image data. Therefore, the resolution enlargement circuit 44 converts, for example, each pixel that constitutes the non-flash image data into nine pixels to thereby multiply the resolution of the non-flash image data ninefold. It is to be noted that the resolution enlargement circuit 44 may use a pixel value of an original pixel before the pixel conversion as the pixel value of a new pixel generated by performing the pixel conversion. The resolution enlargement circuit 44 may determine the pixel value of the new pixel by use of a known pixel interpolating method. For example, the resolution enlargement circuit 44 may obtain the pixel value of the new pixel by performing predetermined-weighted-averaging (including simple averaging) of the pixel values based on distances between the new pixel and a plurality of original pixels around the new pixel.

The image combining circuit 60 adds up the pixel values of the associated pixels based on the input non-flash and flash image data to thereby combine the non-flash image data with the flash image data. The image combining circuit 60 outputs the resultant combined image data as the image data for recording. An RGB conversion circuit 62 converts into RGB the image data for recording which has been converted into the color space of YCrCb. A gamma correction circuit 64 performs nonlinear conversion adapted to an output device (e.g., monitor or the like) with respect to the image data for recording which has been converted into the RGB. The recording device 80 stores the gamma-corrected image data for recording as the image data for recording.

When the digital camera constituted as described above receives an image capture instruction in a state in which the night scene portrait mode is set, the image sensor 16 performs the exposure without the emission of the flash light, and outputs the low resolution image data at high sensitivity in the pixel addition output mode. Furthermore, the image sensor 16 performs the exposure with emission of the flash light, and outputs the high resolution image data at low sensitivity in the overall pixel output mode. Moreover, after the resolution conversion circuit 40 converts the resolution of the low resolution image data to be equivalent to that of the high resolution image data, the image combining circuit 60 adds up and combines the two sets of image data.

Next, there will be described an image capture procedure of the digital camera set to the night scene portrait mode with reference to a timing chart shown in FIG. 3.

First, when the image capture section 10 detects that a shutter button is fully pressed, the image sensor 16 switches an output mode to the pixel addition output mode at a time when a vertical synchronizing signal (VD1) just after a mode switch instruction turns to a negative polarity based on the mode switch instruction output from the timing control circuit 30. When the image sensor 16 switches to the pixel addition output mode, the timing generator 32 outputs one or more sub-pulses to the image sensor 16. The image sensor 16 starts substantial exposure for performing non-flash image capture at a time when the outputting of the sub-pulses stops, and ends the exposure at a time when the existing vertical synchronizing signal (VD2) turns to the negative polarity. That is, an exposure period Ta for the non-flash image capture is from the time when the outputting of the sub-pulses stops until the existing vertical synchronizing signal turns to the negative polarity. Therefore, when the number of outputs of the sub-pulses is controlled, the exposure period Ta for the non-flash image capture can be controlled. After the end of the exposure for the non-flash image capture, the timing generator 32 outputs a read pulse, and accordingly the image sensor 16 outputs the non-flash image data.

Moreover, while outputting the non-flash image data, the image sensor 16 starts the exposure for flash image capture at a time when the vertical synchronizing signal (VD3) turns to a positive polarity. Furthermore, the image sensor 16 ends the exposure at a time when the mechanical shutter 14 closes. That is, the image sensor 16 performs the exposure for the flash image capture while outputting the non-flash image data in the pixel addition output mode. The flash circuit 34 emits the flash light in an exposure period Tb. Thereafter, after the end of the outputting of the non-flash image data in the pixel addition output mode, the image sensor 16 is switched to the overall pixel output mode to start the outputting of the flash image data.

As will be apparent from the timing chart shown in FIG. 3, the exposure period Ta at a non-flash image capture time is adjusted by the outputting of the sub-pulses, and the exposure period Tb at a flash image capture time is adjusted by opening/closing the mechanical shutter 14. The image sensor 16 performs the exposure for the flash image capture while outputting the non-flash image data in the pixel addition output mode. Consequently, in the present embodiment, there is hardly any time lag between the non-flash image capture and the flash image capture. Therefore, a synthesized picture can be an intended picture, even if the main subject moves from a time when the non-flash image capture is completed until the flash image capture is completed.

As described above, in the present embodiment, the image sensor 16 adds up the pixels in the pixel addition output mode to thereby output the low resolution non-flash image data at high sensitivity. On the other hand, the image sensor 16 outputs the high resolution flash image data at low sensitivity in the overall pixel output mode without adding up the pixels. Subsequently, the resolution conversion circuit 40 converts the resolution of the non-flash image data to be equivalent to that of the flash image data. Moreover, the image combining circuit 60 adds up and combines the non-flash image data and the flash image data that have the equal resolution to thereby generate the image data for recording.

Consequently, according to the present embodiment, the non-flash image data is output in the pixel addition output mode to thereby realize high sensitivity. Therefore, it is possible to shorten the exposure period for outputting the non-flash image data. This can prevent degradation of the image quality due to camera shake or movement of the person.

Moreover, the non-flash image data is output in the pixel addition output mode to thereby realize high sensitivity. Therefore, it is possible to prevent increase of noise at a time when the exposure period is shortened and the amplification factor of the image data output by the image sensor 16 is raised.

Furthermore, the image data is output in the pixel addition output mode, and the resolution of the image data having comparatively less noise is enlarged. Therefore, the resolution can be converted into high resolution while keeping a certain degree of image quality.

As described above, according to the present embodiment, a user can obtain a picture in which both of the nighttime background and the main subject are shown clearer than those in a picture obtained by simply performing the non-flash or flash image capture.

Additionally, there is preferably a certain degree of luminance difference between a main subject portion illuminated with the flash light and a background portion that is not illuminated with the flash light in order to add up and combine the non-flash image data and the flash image data as described above and obtain a picture in which the main subject and the background are shown clearly. That is, the background portion of the image obtained from the flash image data is preferably as dark as possible. Accordingly, the background portion of the image obtained from the non-flash image data appears more clearly in the combined image. However, it is difficult for the user to judge the luminance of the subject field and judge whether or not the image capture is possible in the night scene portrait mode.

To solve the problem, in a modification of the present embodiment, as described later, after a digital camera judges whether or not a scene can be photographed in the above-described night scene portrait mode based on a predetermined judgment standard, the scene is photographed in the night scene portrait mode only when the photographing is judged to be possible. On the other hand, when the photographing is judged to be impossible, the scene is photographed in a usual portrait mode. It is to be noted that the portrait mode is an image capture mode suitable for taking a clear picture of a main subject such as a person in preference to the background.

Figure 4:
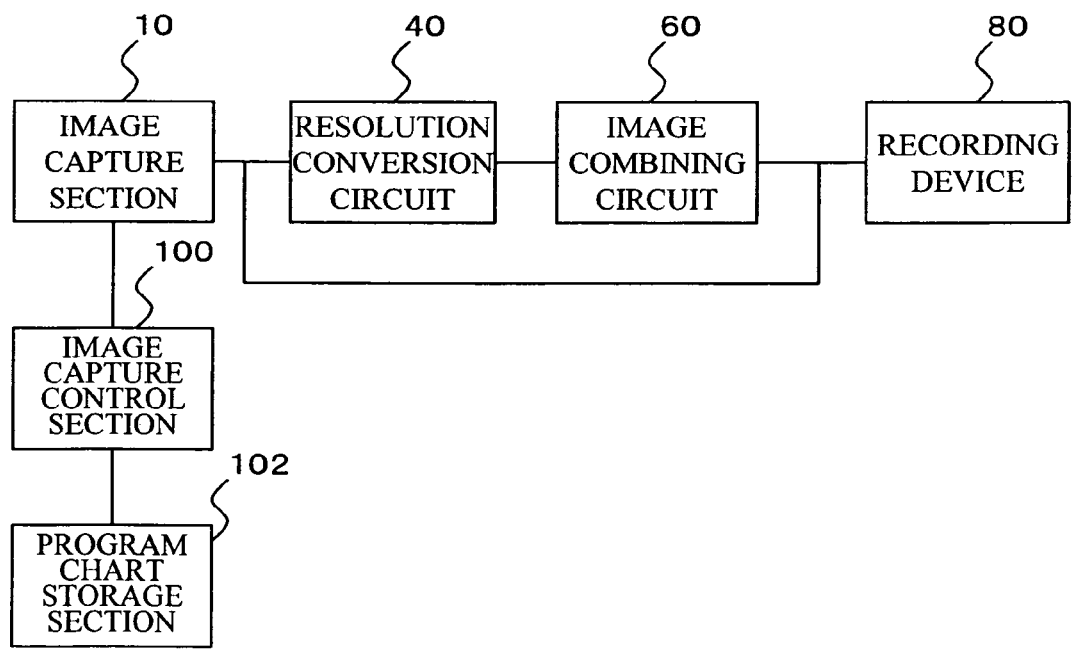
FIG. 4 is a diagram schematically showing functional blocks of the digital camera in a modification of the present embodiment.

FIG. 4 is a diagram showing functional blocks of the digital camera in the modification. In FIG. 4, the same circuits and the like as those shown in FIG. 1 are denoted with the same reference numerals, and description thereof is omitted.

In FIG. 4, an image capture control section 100 controls an image capture section 10 in accordance with a set image capture mode. In the present modification, to facilitate the description, a night scene portrait mode and a portrait mode are prepared as image capture modes selectable by the digital camera.

A program chart storage section 102 stores a exposure program diagram required for each image capture mode. Here, the exposure program diagram is data which determines conditions for determining a value of at least one of a shutter speed, a diaphragm value, and an ISO sensitivity based on a luminance of a subject field in order to obtain adequate exposure. One exposure program diagram is usually prepared for one image capture mode. However, in the present modification, two exposure program diagrams for non-flash image capture and flash image capture are prepared for the night scene portrait mode, and stored beforehand in the exposure program diagram storage section 102, respectively. Therefore, in the night scene portrait mode, exposure conditions can be individually determined depending on whether or not the flash light is to be emitted. Especially in the present modification, the exposure program diagram for the flash image capture in the night scene portrait mode is determined on conditions different from those of the exposure program diagram for use at a flash image capture time in the portrait mode. To be more specific, the exposure program diagram for the flash image capture is predetermined in the night scene portrait mode in such a manner that the shutter speed in the night scene portrait mode at the flash image capture time is higher than that in the portrait mode at the flash image capture time. When the shutter speed is set to be high in this manner, light from a background portion that is not illuminated with flash light does not easily enter the image sensor 16, and it is possible to obtain image data in which the background portion is comparatively dark. Accordingly, the background portion is shown more clearly in a picture obtained from a combined image. For example, when the shutter speed at a usual flash image capture time is set to 1/30 [sec], the shutter speed in the night scene portrait mode at a flash image capture time is set to 1/200 [sec].

However, in a case where the luminance (i.e., the luminance of the whole subject field before emission of the flash light) of the subject field portion that is not illuminated with the flash light has a certain degree of magnitude, even if the shutter speed is set to be high, the light other than the flash light enters the image sensor 16. That is, in a case where the luminance has a certain degree of magnitude, even if the shutter speed is set to be high, the background portion of the image obtained from the flash image data becomes bright to a certain degree. Therefore, the background portion of the image obtained from the non-flash image data is not clearly shown in the combined image. Therefore, in a case where the luminance of the subject field has a certain degree of magnitude, it is preferable not to perform the image capture in the night scene portrait mode.

To solve the problem, in the present modification, a threshold luminance LVf is determined, and the image capture in the night scene portrait mode is permitted when the luminance of the subject field is not more than the threshold luminance LVf. As the threshold luminance LVf, a value is obtained by, for example, subtracting a predetermined luminance difference $\Delta LVa$ from a target luminance LVt (i.e., the luminance of the subject field portion illuminated with the flash light) required for obtaining adequate exposure in a case where the flash image capture is performed in the night scene portrait mode. Here, to obtain the luminance difference $\Delta LVa$, the image capture may be performed in the night scene portrait mode on various luminance conditions to determine an optimum value. The threshold luminance LVf may be changed depending on a zoom position of a zoom lens. This is because it is considered that the target luminance LVt required for securing the adequate exposure determined by the exposure program diagram differs with the zoom position.

Figure 5A:
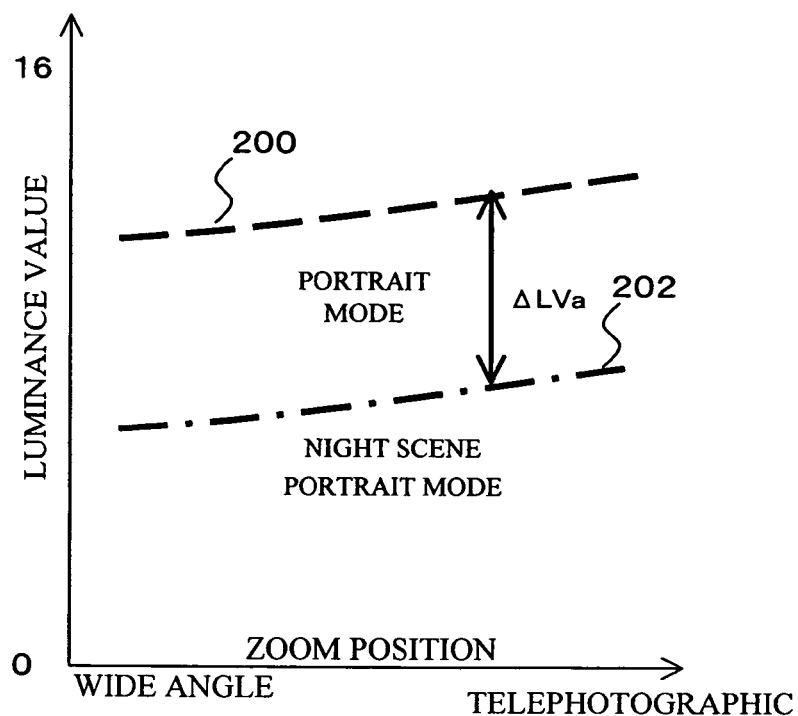
FIG. 5A is an explanatory view of a threshold luminance LVf indicating a standard for judging whether or not to permit the night scene portrait mode.

FIG. 5A is a diagram showing a relation between the target luminance LVt and the threshold luminance LVf in each zoom position of the zoom lens. In FIG. 5A, a broken line 200 indicates the target luminance LVt, and a one-dot chain line 202 indicates the threshold luminance LVf. FIG. 5A shows that the digital camera performs image capture in the night scene portrait mode in a case where the luminance of the subject field is not more than the threshold luminance LVf, and the digital camera performs the image capture in the portrait mode in a case where the luminance of the subject field is higher than the threshold luminance LVf.

Figure 5B:
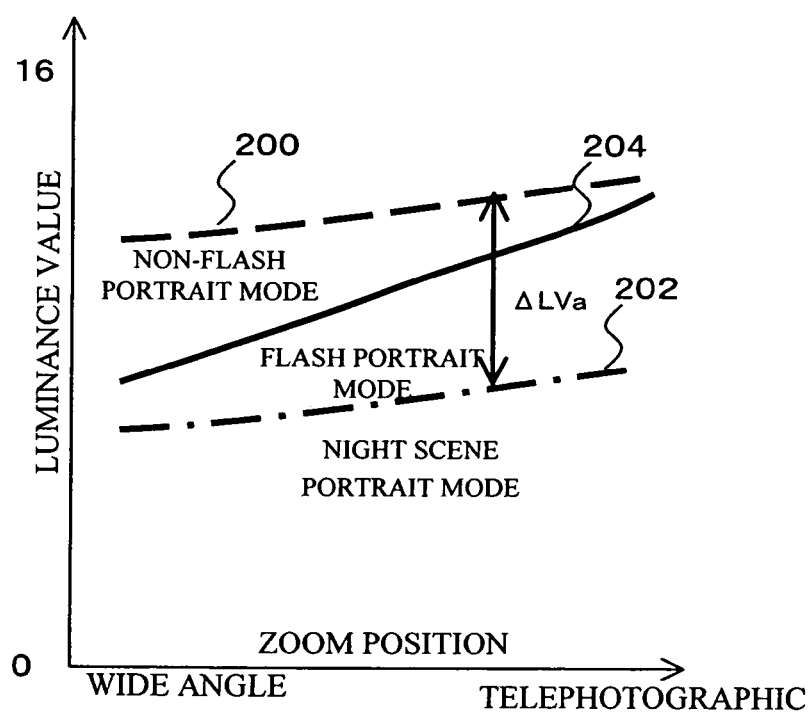
FIG. 5B is an explanatory view of the threshold luminance LVf indicating the standard for judging whether or not to permit the night scene portrait mode.

In FIG. 5B, in addition to the target luminance LVt and the threshold luminance LVf, a flash threshold luminance LVp determined in the exposure program diagram for the portrait mode is shown by a solid line 204. Here, the flash threshold luminance LVp is a threshold value for judging whether or not illumination with the flash light is required in order to obtain adequate exposure. That is, the digital camera judges that emission of the flash light is required in a case where the luminance of the subject field before the emission of the flash light is not more than the flash threshold luminance LVp. The digital camera judges that the emission of the flash light is not required in a case where the luminance is larger than the flash threshold luminance LVp. When each threshold luminance is determined as shown in FIG. 5B, the digital camera operates as follows. That is, when the luminance of the subject field is not less than the flash threshold luminance LVp, the digital camera performs the non-flash image capture in the portrait mode. When the luminance of the subject field is in a range of the flash threshold luminance LVp to the threshold luminance LVf, the digital camera performs the flash image capture in the portrait mode. Furthermore, when the luminance of the subject field is not more than the threshold luminance LVf, the digital camera performs the non-flash image capture and the flash image capture in the night scene portrait mode.

Figure 5C:
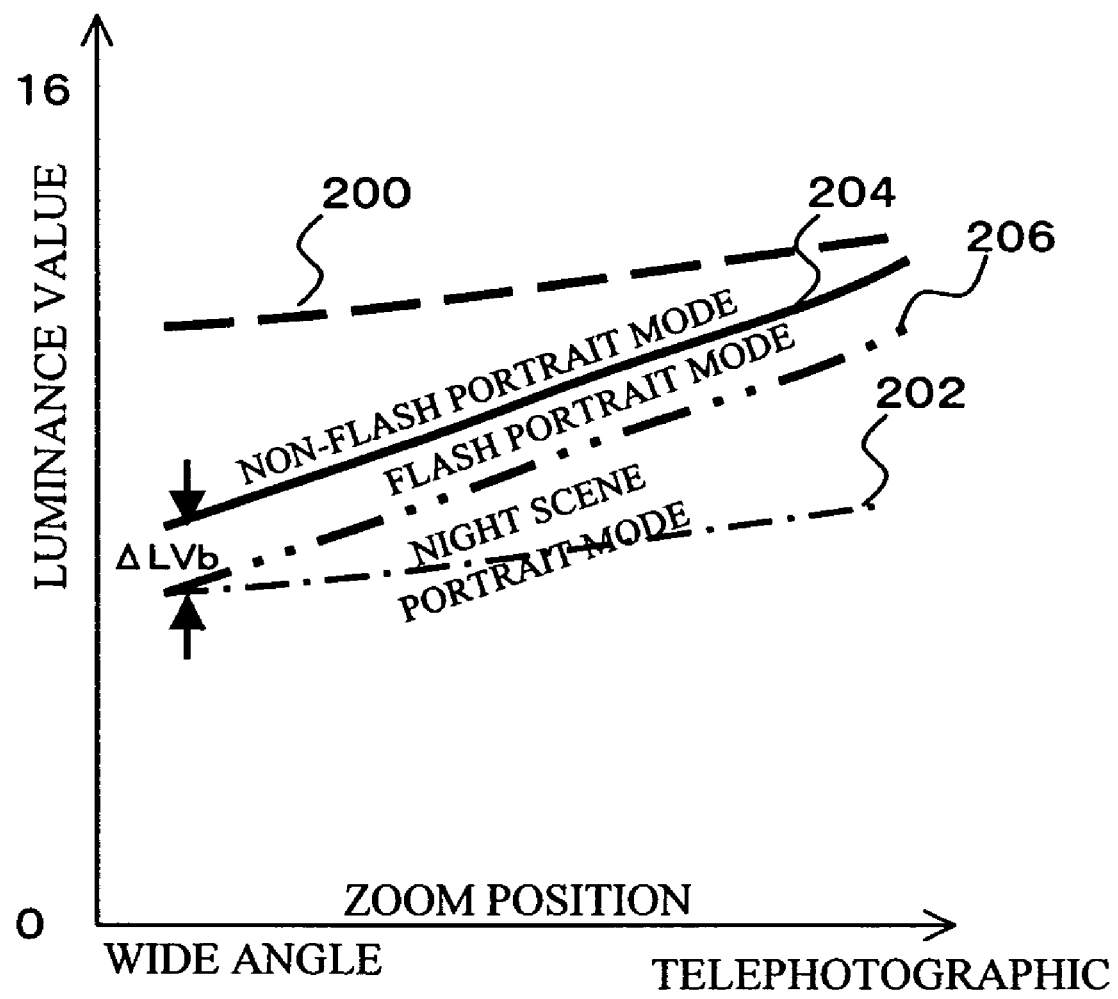
FIG. 5C is an explanatory view of the threshold luminance LVf indicating the standard for judging whether or not to permit the night scene portrait mode.

In FIGS. 5A and 5B, the threshold luminance LVf is determined in such a manner that the predetermined luminance difference $\Delta LVa$ is made between the luminance (target luminance LVt) of the subject field portion illuminated with the flash light and the luminance of the subject field portion that is not illuminated with the flash light. However, as seen from FIG. 5B, when the zoom position is on a telephotographic side, the difference between the flash threshold luminance LVp and the threshold luminance LVf increases. This means that the image capture cannot be performed in the night scene portrait mode although the subject field has such a low luminance as to require the flash light. Therefore, when the threshold luminance LVf is determined in this manner, there are more scenes in which the night scene portrait mode cannot be selected on the telephotographic side, and there is a possibility that ease of use for the user will be degraded. To solve the problem, as shown in FIG. 5C, a value obtained by subtracting a certain value ΔLVb from the flash threshold luminance LVp may be described as the threshold luminance LVf. In FIG. 5C, a two-dot chain line 206 indicates the threshold luminance LVf.

As described above, in the present modification, the image capture in the night scene portrait mode is permitted in a case where the luminance of the subject field is lower than the threshold luminance LVf predetermined by actual measurement or the like.

Furthermore, even in a case where the luminance is low to a certain degree, when the digital camera is distant from the main subject, the main subject is not illuminated with the flash light. Therefore, the luminance difference between the main subject portion and the background portion decreases. Therefore, it is preferable not to perform the image capture in the night scene portrait mode even in a case where the main subject is not illuminated with the flash light.

In addition, the image capture in the night scene portrait mode is effective for photographing the night scene well. Therefore, it is preferable not to perform the image capture in the night scene portrait mode even in a case where the subject field is so bright that the main subject does not have to be illuminated with the flash light.

Moreover, the image capture in the night scene portrait mode cannot be performed in a state in which the emission of the flash light is prohibited in the digital camera. Here, examples of the prohibited state include: a case where a flash device built into the digital camera is of a so-called manual popup type, and the flash device is closed up; and a case where the digital camera is set in such a manner as to forcibly prohibit the emission of the flash light.

Figure 6:
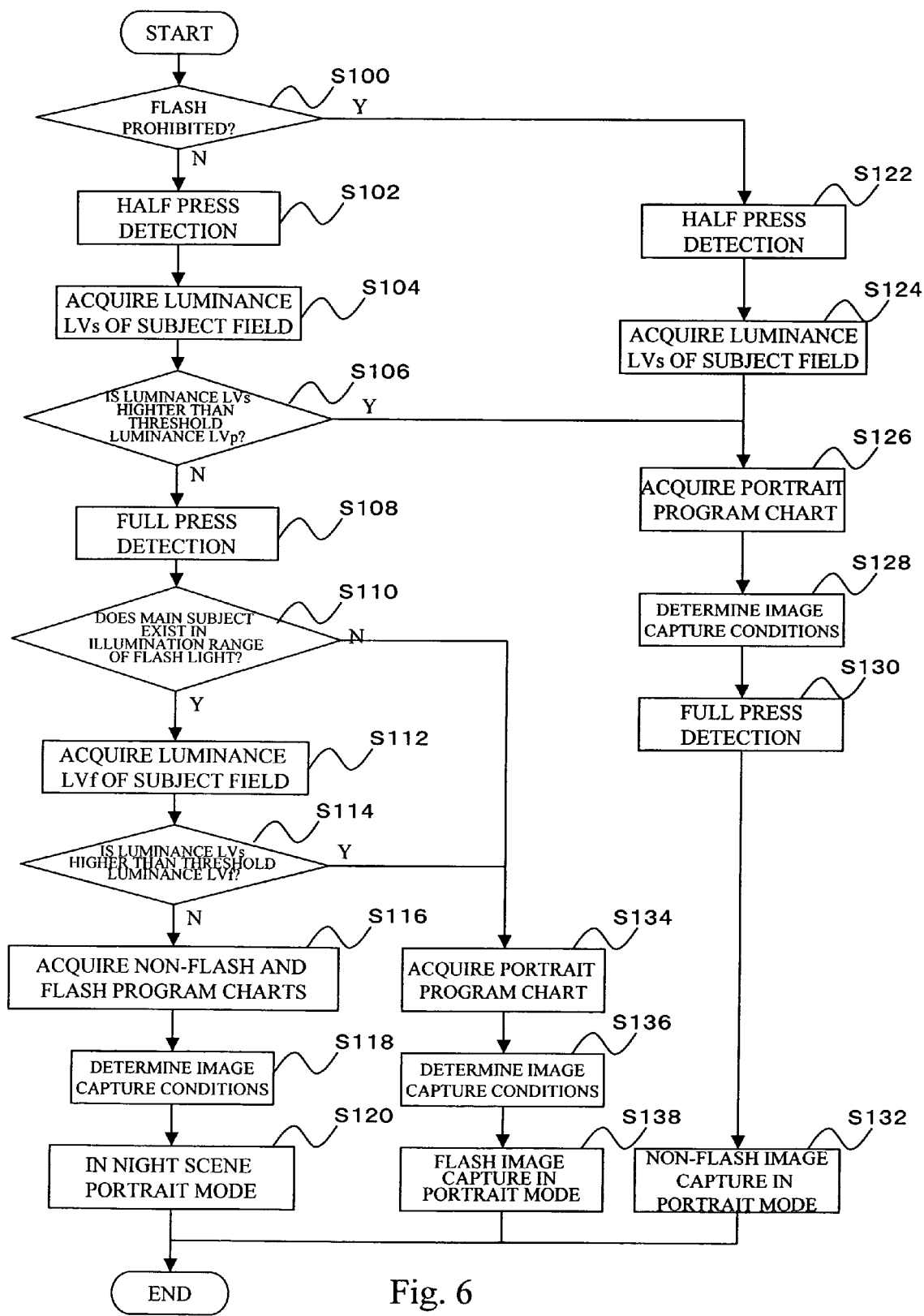
FIG. 6 is a flowchart in judging whether or not the digital camera set to the night scene portrait mode permits the image capture in the night scene portrait mode.

From the above-described viewpoint, in a case where the night scene portrait mode is selected, the image capture control section 100 judges whether or not to permit the image capture in the night scene portrait mode based on a flowchart shown in FIG. 6. Moreover, the digital camera performs the image capture in the night scene portrait mode, when the image capture is permitted as a result of the judgment. The digital camera performs the image capture in the portrait mode in a case where the image capture in the night scene portrait mode is not permitted.

In FIG. 6, first, when the night scene portrait mode is selected, the image capture control section 100 judges whether or not the emission of the flash light is prohibited (S100). When the emission of the flash light is permitted as a result of the judgment (the judgment result of S100 is negative "N"), the image capture control section 100 waits until the shutter button is half pressed. Thereafter, when the image capture control section 100 detects that the shutter button has been half pressed (S102), the section acquires a luminance LVs of the subject field from a photometry device or the like (S104), and judges whether or not the luminance LVs is higher than the flash threshold luminance LVp (S106).

When the luminance LVs is judged to be lower than the threshold luminance LVp as a result of the judgment of S106 (the judgment result of S106 is negative "N"), the image capture control section 100 waits until the shutter button is fully pressed. Thereafter, when the image capture control section 100 detects that the shutter button has been fully pressed (S108), the section judges whether or not the main subject exists in a region illuminated with the flash light (S110). This judgment is performed by, for example, the flash circuit 34 that utilizes pre-emission prior to substantial emission in response to the operation of fully pressing the shutter button. That is, the image capture control section 100 acquires a quantity of light reflected from the main subject illuminated with the pre-emission from a photometry circuit. Moreover, the image capture control section 100 judges whether or not the main subject exists in the region illuminated with the flash light by judging whether or not the reflected light quantity reaches a predetermined threshold light quantity.

When it is judged that the main subject exists in the region illuminated with the flash light as a result of the judgment of S110 (the judgment result of S110 is affirmative "Y"), the image capture control section 100 acquires the threshold luminance LVf (S112), and judges whether or not the luminance LVs is higher than the threshold luminance LVf (S114). As a result of the judgment, when the luminance LVs is judged to be not more than the threshold luminance LVf (the judgment result of S114 is negative "N"), the image capture control section 100 acquires the non-flash and flash exposure program diagrams in the night scene portrait mode from the exposure program diagram storage section 102 (S116). The image capture control section 100 determines image capture conditions such as the shutter speed, the diaphragm value, and the ISO sensitivity for each acquired exposure program diagram (S118). Thereafter, the image capture control section 100 controls the image capture section 10 in such a manner as to perform the image capture in the night scene portrait mode (S120).

Moreover, when it is judged that the emission of the flash light is prohibited in S100 (the judgment result of S100 is affirmative "Y"), the image capture cannot be performed in the night scene portrait mode, and the image capture control section 100 therefore waits until the shutter button is half pressed. Thereafter, when the image capture control section 100 detects that the shutter button has been half pressed (S122), the section acquires the luminance LVs of the subject field (S124). Furthermore, the image capture control section 100 acquires the exposure program diagram for the portrait from the exposure program diagram storage section 102 (S126), and determines the image capture conditions based on the exposure program diagram for the portrait (S128). Every time the image capture control section 100 detects that the shutter button has been fully pressed (S130), the section controls the image capture section 10 in such a manner as to perform the non-flash image capture in the portrait mode (S132).

Furthermore, when it is judged in S110 that the main subject does not exist in the region illuminated with the flash light (the judgment result of S110 is negative "N"), and it is judged in S114 that the luminance LVs is higher than the threshold luminance LVf, the image capture control section 100 acquires the exposure program diagram for the portrait from the exposure program diagram storage section 102 (S134). Moreover, the image capture control section 100 determines the image capture conditions based on the exposure program diagram (S136), and controls the image capture section 10 in such a manner as to perform the flash image capture in the portrait mode (S138).

As described above, according to the present modification, the digital camera judges whether or not the scene can be photographed in the night scene portrait mode based on the predetermined judgment standard. Thereafter, the only scene from which a satisfactory picture is presumed to be obtained is photographed in the night scene portrait mode, and the scene from which the satisfactory picture is not presumed to be obtained is photographed in the portrait mode. Accordingly, there is a high possibility that a satisfactory picture will be obtained in a case where the image capture in the night scene portrait mode is performed.

In the above-described embodiment, the example has been described in which nine pixels of the same color are added up in a case where the image sensor 16 outputs the image data in the pixel addition output mode. However, the number of pixels to be added up in the pixel addition output mode is not limited to nine, and the image sensor 16 may add up, for example, four pixels to output the non-flash image data.

Moreover, the example has been described in which the image sensor 16 outputs the flash image data in the overall pixel output mode. However, in a case where the image sensor 16 can output the image data in a plurality of pixel addition output modes in which the number of the pixels to be added up varies, the image sensor 16 may output the flash image data in the pixel addition output mode in which pixels less than those of the non-flash image data are added up.

Figure 7:
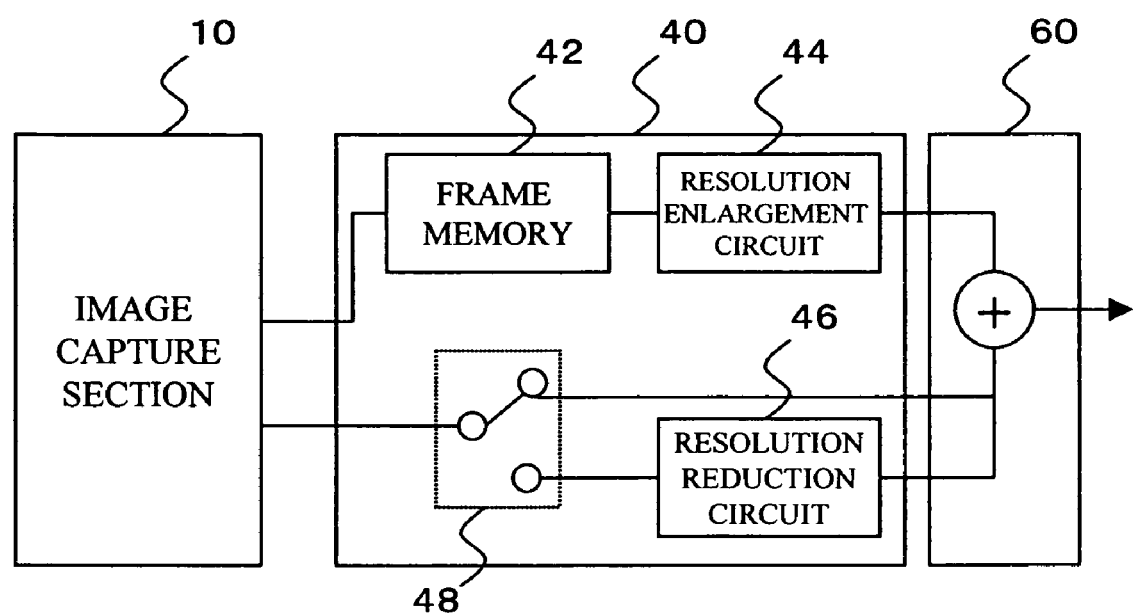
FIG. 7 is a diagram showing functional blocks in a modification of a resolution conversion circuit.

Furthermore, the example has been described in which the resolution conversion circuit 40 enlarges the resolution of the non-flash image data to thereby convert the resolution of the flash image data to be equivalent to that of the non-flash image data. However, as shown in FIG. 7, a resolution reduction circuit 46 may be disposed on a flash image data side to control a third selector 48. Accordingly, the resolution conversion circuit 40 may reduce the resolution of the flash image data while enlarging the resolution of the non-flash image data to thereby set the resolutions of both of the image data to be equivalent to each other.

In addition, in the above-described embodiment, the example of the digital camera has been described that is capable of selecting a plurality of image capture modes such as the night scene portrait mode and the portrait mode. However, the present invention is not limited to such a digital camera, and can be realized even by a digital camera which is for exclusive use in night scene portrait image capture without operating in a plurality of image capture modes.

Moreover, in the digital camera according to the present embodiment, the above-described function of the present embodiment is realized by reading and executing a control program stored in a storage medium by a computer, but the present invention is not limited to this constitution. Needless to say, the present invention includes a case where a part or all of actual processing of an operating system (OS) operating on the computer is performed based on an instruction of the control program, and the above-described function of the present embodiment is realized by the processing.

Furthermore, examples usable as the storage medium to store the control program include Floppy (registered trademark) disk, a hard disk, an optical disk, a magneto-optical disk, a compact disk read only memory (CD-ROM), a compact disk recordable (CD-R), a magnetic tape, a nonvolatile memory card, and a ROM chip.

What is claimed is:

1. A digital camera, comprising:
an image sensor that converts subject image information into an image signal and outputs the image signal; and
a flash circuit for emitting flash light, wherein the image sensor has a first image capture mode in which a first image signal having a relatively large number of pixels captured at a relatively low sensitivity is output, and a second image capture mode in which a second image signal having a relatively small number of pixels captured at a relatively high sensitivity is output, the digital camera further comprising:
an image capture control circuit that performs an operation for capturing and outputting the second image signal in the second image capture mode without emission of flash light by the flash circuit and an operation for capturing and outputting the first image signal in the first image capture mode with emission of flash light by the flash circuit; and
an image combining circuit that combines the first image signal and the second image signal after resizing a number of pixels of at least one image signal of the first image signal and the second image signal.

2. The digital camera according to claim 1, wherein electric charges of a plurality of pixels of the image sensor are added up to thereby capture and output the signal at the high sensitivity in the second image capture mode.

3. The digital camera according to claim 2, wherein exposure of the image sensor is controlled with reference to different exposure program diagram in the first image capture mode and the second image capture mode.

4. The digital camera according to claim 2, wherein exposure in the first image capture mode is started in parallel with the operation for outputting the second image signal immediately after the exposure ends in the image capture operation of the second image capture mode.

5. The digital camera according to claim 2, wherein the image capture control circuit controls an exposure period by means of an electronic shutter in the second image capture mode, and controls the exposure period by means of a mechanical shutter in the first image capture mode.

6. The digital camera according to claim 1, wherein an image combining circuit combines both images after resizing the number of the pixels of at least one of the first image signal and the second image signal to set the number of the pixels of one image signal to be equivalent to that of the pixels of the other image signal.

7. A digital camera which performs a night scene portrait image capture, comprising:
a flash circuit which emits flash light;
an image sensor which outputs image data at a high or low sensitivity;
an image capture control circuit which performs a high sensitivity image capture control and a low sensitivity image capture control in a case where an instruction for the night scene portrait image capture is received and which allows the image sensor to perform exposure and output low resolution image data having a relatively low resolution at the high sensitivity without the emission of the flash light by the flash circuit in the high sensitivity image capture control and which allows the image sensor to perform the exposure and output high resolution image data having a relatively high resolution at the low sensitivity with the emission of the flash light by the flash circuit in the low sensitivity image capture control; and
an image combining circuit which combines the low resolution image data and the high resolution image data output from the image sensor in the night scene portrait image capture after resizing an image size of at least one of the low resolution image data and the high resolution image data.

8. The digital camera according to claim 7, wherein the image sensor operates in a first output mode in which the image data is output at a predetermined resolution and a second output mode in which a plurality of pixels are added up to thereby output the image data at a resolution that is lower than the predetermined resolution, and
the image capture control circuit controls the image sensor in such a manner that the image data is output in the second output mode to thereby output the low resolution image data and the image data is output in the first output mode to thereby output the high resolution image data in a case where the instruction for the night scene portrait image capture is received.

9. The digital camera according to claim 7, further comprising:

an image capture permission judgment section which permits the night scene portrait image capture in a case where a luminance of a subject field before the emission of the flash light is not more than a predetermined threshold luminance, wherein the image capture control circuit enables the night scene portrait image capture in a case where the image capture permission judgment section permits the night scene portrait image capture.

10. The digital camera according to claim 9, wherein the threshold luminance is a value obtained by subtracting a predetermined value from a target luminance of the subject field required for securing predetermined adequate exposure.

11. The digital camera according to claim 10, wherein the threshold luminance is a value which is lower than a flash threshold luminance as a judgment standard in a case where the image capture control circuit judges based on the luminance of the subject field whether or not the flash light needs to be emitted in order to secure the predetermined adequate exposure.

12. The digital camera according to claim 9, wherein the image capture permission judgment section changes the threshold luminance based on a zoom position of a zoom lens.

13. The digital camera according to claim 9, wherein the image capture permission judgment section judges whether or not a main subject exists in an illumination region illuminated with the flash light emitted by the flash circuit, and permits the night scene portrait image capture in a case where the main subject exists in the illumination region.

14. An image capture method of performing night scene Portrait image capture, comprising:

a step of allowing an image sensor to perform exposure and output low resolution image data having a relatively low resolution at a high sensitivity without emission of flash light by a flash circuit, and allowing the image sensor to perform the exposure and output high resolution image data having a relatively high resolution at a low sensitivity with the emission of the flash light by the flash circuit in a case where an instruction for the night scene portrait image capture is received; and a step of allowing an image combining circuit to combine the low resolution image data and the high resolution image data output from the image sensor in the night scene portrait image capture after resizing an image size of at least one of the low resolution image data and the high resolution image data.

* * * * *